A. GROVES.
VARIABLE SPEED GEARING.
APPLICATION FILED SEPT. 19, 1916.

1,221,047.

Patented Apr. 3, 1917.
2 SHEETS—SHEET 2.

Inventor
Albert Groves
By Knight Bros
his Attorneys

UNITED STATES PATENT OFFICE.

ALBERT GROVES, OF ACTON, LONDON, ENGLAND.

VARIABLE-SPEED GEARING.

1,221,047.

Specification of Letters Patent.   Patented Apr. 3, 1917.

Application filed September 19, 1916. Serial No. 120,968.

*To all whom it may concern:*

Be it known that I, ALBERT GROVES, a subject of the King of Great Britain, residing at Acton, in the county of London, England, have invented certain new and useful Improvements in Variable-Speed Gearing, of which the following is a specification.

This invention relates to variable speed gearing whereby the speed of one shaft may be varied in its relation to the speed of another shaft without interruption of the transmission of power.

In carrying the invention into effect I employ sets of teeth arranged like toothed wheels around different parts of a tapered body and at right angles to its axis, and I connect each adjacent pair of such sets of teeth by two sets of teeth arranged helically around the drum, and in gear with such teeth I employ a toothed pinion.

According to the present invention the width of the teeth in the toothed pinion is the same as the width of the teeth in the toothed wheels and in the helical sets of teeth, and at the junctions between the helical sets of teeth and the toothed wheels the teeth in the helical parts are arranged concentric with the toothed wheels.

This construction allows the pinion to readily move longitudinally out of the toothed wheels before it commences to move away from or toward the axis of the tapered body in following a helical path from one toothed wheel to another, and it allows the pinion to readily enter a toothed wheel from its helical path.

Suitable means are provided for moving the pinion longitudinally with respect to the tapered body and at the same time in a path parts of which are parallel to the axis of the tapered body and parts of which are parallel to the tapered body, or more strictly speaking, in a path so that it will correctly mesh with the helical teeth.

The invention is illustrated in the accompanying drawings, in which:—

Fig. 3 shows, by broken lines an end view of the edges of the various sets of teeth, and Fig. 4 is a side elevation of the change speed lever.

Figure 1:
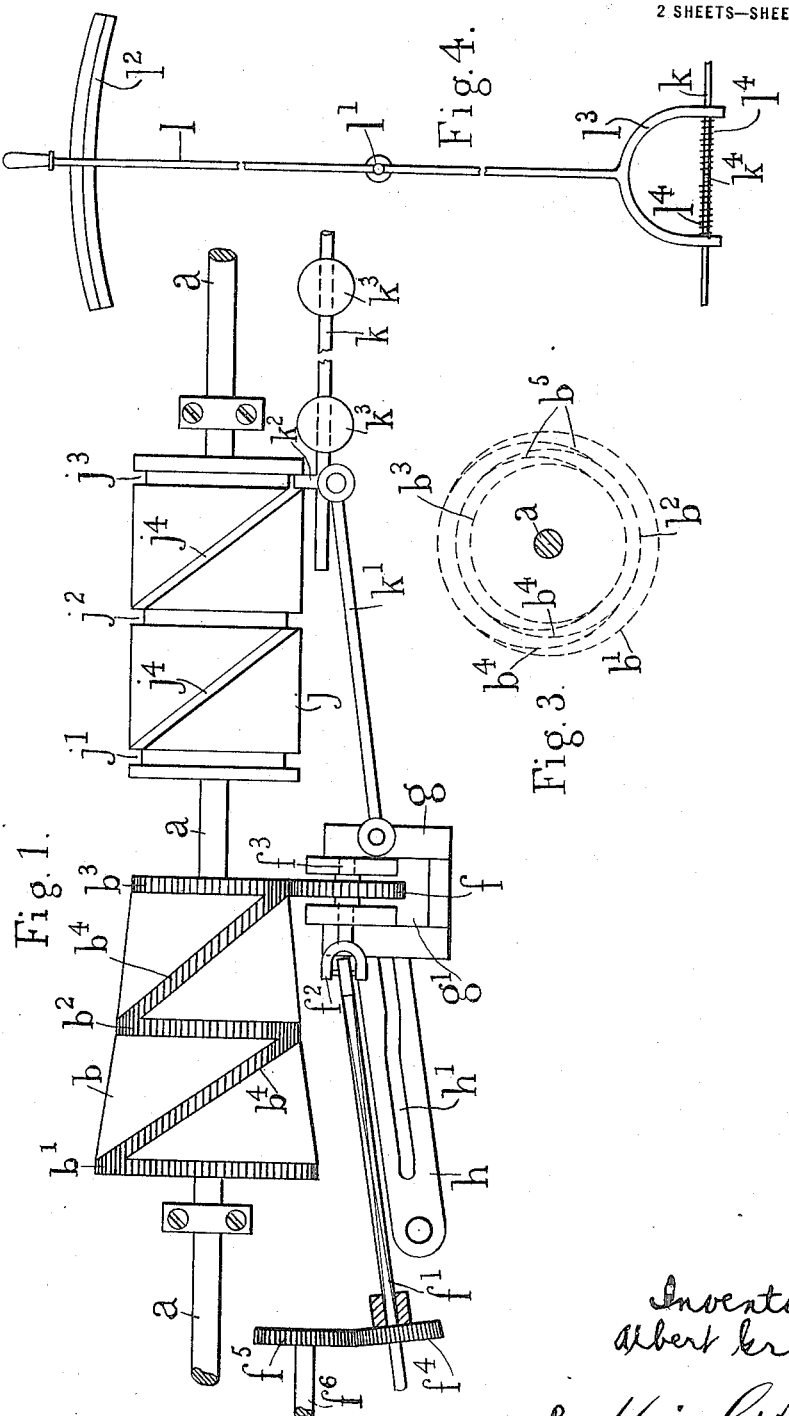
Figure 1 shows, somewhat diagrammatically, a plan of the gearing.

The drawings show a three-speed toothed gear, although other numbers of gears may be employed.

$a$ is the driving shaft, upon which is fixed a tapered body $b$, having three toothed wheels, $b'$, $b^2$, $b^3$, upon its outer surface of different diameters, from which the various speeds are selected.

The said three toothed wheels, $b'$, $b^2$, $b^3$, are spaced apart sufficiently to allow for the provision on the exterior of the tapered body $b$, of two series of spur teeth, $b^4$, $b^5$, arranged helically, the one, $b^4$, extending from the smaller to the larger toothed wheels in a left-hand direction, and the other, $b^5$, extending from the larger to the smaller toothed wheels in a right-hand direction.

These two spiral paths are provided to allow the driving pinion $f$ to be passed from one toothed wheel to another in either direction. The edges of all the teeth are parallel to the axis of the tapered body $b$.

The pinion $f$ may be connected to the prime mover by a sliding shaft $f'$, which is square and slides through the bevel pinion $f^4$, driven by the bevel pinion $f^5$, on the prime mover shaft $f^6$. The sliding shaft $f'$ is connected by means of a universal joint $f^2$ with the shaft $f^3$. The pinion $f$ is carried by the shaft $f^3$ in bearings upon a sliding cradle $g$, $g'$.

This cradle $g$, $g'$, can be moved along the guide bar $h$, which is so fixed and formed with relation to the shaft $a$, that the pinion $f$ is kept in mesh with the teeth of the spiral paths while being transferred from one speed to another.

Upon the driving shaft $a$ is also fixed the drum $j$, which as shown is a parallel cylindrical one, having three annular grooves, $j'$, $j^2$, $j^3$, upon its face, their distances apart corresponding with those of the three toothed wheels $b'$, $b^2$, $b^3$, upon the tapered body $b$.

Upon the face of the drum $j$ two other grooves $j^4$, $j^5$, are cut in a spiral manner and communicate with the three annular grooves $j'$, $j^2$, $j^3$, one in a right-hand direction, and the other in a left-hand direction. These grooves $j^4$, $j^5$, correspond with the spiral paths of teeth $b^4$ and $b^5$ on the tapered body $b$.

A sliding bar $k$ is provided having a projection $k^2$ which extends into the grooves of the drum $j$. A link $k'$ connects the bar $k$ with that part of the cradle marked $g$.

In order to move the pinion $f$ out of gear with the toothed wheel $b^3$ and into gear with the toothed wheel $b^2$ or $b'$, it is necessary to shunt the projection $k^2$ from the groove $j^3$ into the adjacent spiral groove $j^4$. The projection $k^2$ having been moved from the groove $j^3$ into the groove $j^2$, may again be shunted into the second spiral groove $j^4$, and thus be caused to enter the groove $j'$. The projection $k^2$ returns by means of the spiral grooves $j^5$, $j^5$.

One method of shunting the projection $k^2$ in either direction is to apply pressure to the rod $k$ so as to cause it to slide through its bearings $k^3$ in the required direction.

Figure 2:
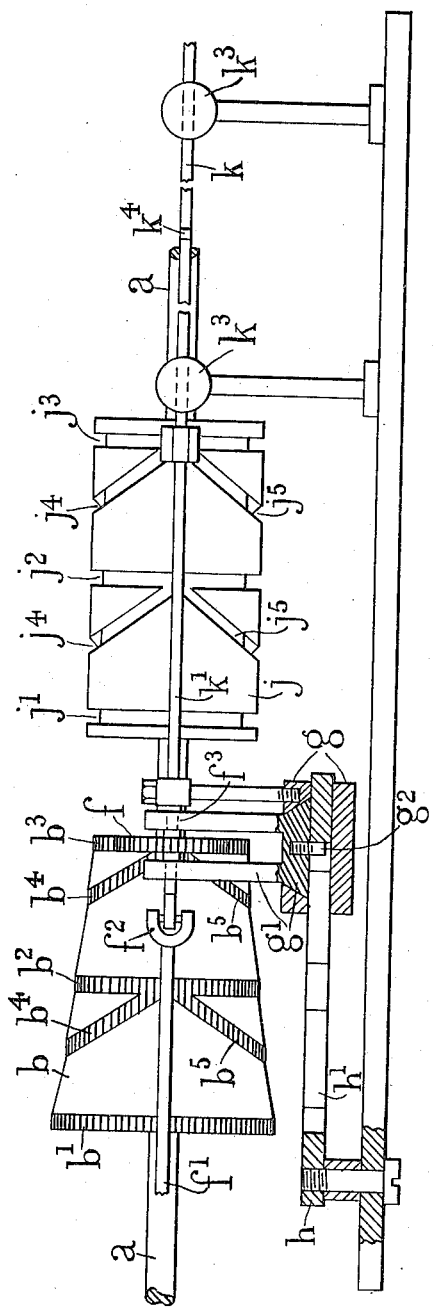
Fig. 2 shows an elevation of the same, certain parts being omitted.

As shown in Figs. 2 and 4 the rod $k$ has a projection $k^4$, and pressure is applied to either side of this projection $k^4$ by means of the change speed lever $l$, which is pivoted at $l'$, and the upper end of which moves over the quadrant $l^2$. The lower end of the lever $l$ is forked at $l^3$, and springs $l^4$ connect each side of the fork $l^3$ with the projection $k^4$, thus enabling spring pressure to be applied to the rod $k$ to move it longitudinally in its bearings $k^3$.

The spiral paths of teeth $b^4$, $b^5$, on the tapered body $b$, and the grooves $j^4$, $j^5$, in the drum $j$, may be modified somewhat from a true spiral.

The cradle $g$, $g'$, is constructed in two parts to allow the requisite lateral movement at right angles to the axis of the shaft $a$. The part $g$ slides upon the exterior of the bar $h$. The part $g'$ slides upon the part $g$ and is controlled by a roller or pin $g^2$ running in an irregularly shaped slot $h'$ in the guide bar $h$.

The object of this mechanism is to give the pinion $f$ a movement parallel with the shaft $a$ while any part of it is in mesh with any part of the toothed wheels $b'$, $b^2$, $b^3$, and a movement in a path so that it will correctly mesh with the teeth $b^4$, $b^5$, in its passage from one speed to another.

The teeth of the spiral paths $b^4$, $b^5$, are arranged concentrically with the shaft $a$ at each of their ends where they join the toothed wheels $b'$, $b^2$, $b^3$, to allow of the movement of the pinion $f$ parallel to the shaft $a$, which continues until it is clear of the toothed wheel. Then the teeth on the spiral paths begin to increase or decrease in distance from the shaft $a$, according to whether the speeds are being increased or decreased.

As seen in Fig. 3 the paths $b^4$, $b^4$, on one side of the central vertical plane, and the paths $b^5$, $b^5$, on the other side of the central vertical plane, merge with the teeth $b'$, $b^2$, $b^3$, before they reach the top and bottom of the body $b$. From the junction the said paths run concentric to the top and bottom of the body $b$ in the position shown.

To prevent confusion I have described the parts marked $b'$, $b^2$, $b^3$, as toothed wheels, the parts marked $b^4$ and $b^5$ as sets of teeth, and the part marked $f$ as a toothed pinion, but these parts may all have plain surfaces and act as friction gear. The horizontal lines on the parts $b'$, $b^2$, $b^3$, $b^4$, $b^5$, and $f$, may equally well represent teeth or shading showing the convexity of the parts, and I wish it to be understood that the expressions "toothed wheels", "sets of teeth", and "toothed pinion" appearing in the claims are intended to include friction surfaces.

What I claim as my invention is:—

1. In variable speed gearing, the combination of a plurality of toothed wheels of different diameters on the same axis, helical sets of teeth leading from the smaller to the larger toothed wheels and other helical sets of teeth leading from the larger to the smaller toothed wheels, the ends of all the helical sets of teeth being concentric with the toothed wheels, a toothed pinion in gear with the toothed wheels and helical sets of teeth, means for driving said toothed pinion and means for moving the toothed pinion in a path parts of which are parallel to the axis of the toothed wheels and parts of which are at an angle to the said axis, so that the toothed pinion may accurately gear with the toothed wheels and helical paths, substantially as set forth.

2. In variable speed gearing, the combination of a plurality of toothed wheels of different diameters on the same axis, helical sets of teeth leading from the smaller to the larger toothed wheels and other helical sets of teeth leading from the larger to the smaller toothed wheels, the ends of all the helical sets of teeth being concentric with the toothed wheels, a toothed pinion in gear with the toothed wheels and helical sets of teeth, a cradle in which the pinion is mounted, a slotted guide bar on which the cradle slides, a projection on the cradle entering the slot in the guide bar, and means for moving the cradle along the guide bar, substantially as set forth.

3. In variable speed gearing, the combination of a plurality of toothed wheels of different diameters on the same axis, helical sets of teeth leading from the smaller to the larger toothed wheels and other helical sets of teeth leading from the larger to the smaller toothed wheels, the ends of all the helical sets of teeth being concentric with the toothed wheels, a toothed pinion in gear with the toothed wheels and helical sets of teeth, a cradle in which the pinion is mounted, a slotted guide bar on which the cradle slides, a projection on the cradle entering the slot in the guide bar, a drum mounted upon the same shaft as the toothed wheels and having annular and helical grooves corresponding with the toothed wheels and helical sets of teeth, a sliding bar having a projection entering the said grooves, a link connecting the sliding bar and the cradle, and means for imparting longitudinal motion to the sliding bar, substantially as set forth.

4. In variable speed gearing, the combination of a plurality of toothed wheels of different diameters on the same axis, helical sets of teeth leading from the smaller to the larger toothed wheels and other helical sets of teeth leading from the larger to the smaller toothed wheels, the ends of all the helical sets of teeth being concentric with the toothed wheels, a toothed pinion in gear with the toothed wheels and helical sets of teeth, a cradle in which the pinion is mounted, a slotted guide bar on which the cradle slides, a projection on the cradle entering the slot in the guide bar, a drum mounted upon the same shaft as the toothed wheels and having annular and helical grooves corresponding with the toothed wheels and helical sets of teeth, a sliding bar having a projection entering the said grooves, a link connecting the sliding bar and the cradle, a projection on the sliding bar, a pivoted change speed lever, and springs connecting the change speed lever with the said projection, substantially as set forth.

5. In variable speed gearing, the combination of a plurality of toothed wheels of different diameters on the same axis, helical sets of teeth leading from the smaller to the larger toothed wheels and other helical sets of teeth leading from the larger to the smaller toothed wheels, the ends of all the helical sets of teeth being concentric with the toothed wheels, a toothed pinion in gear with the toothed wheels and helical sets of teeth, a cradle made in two parts in one of which the pinion is mounted, a slotted guide bar on which the other part of the cradle slides, a projection on that part of the cradle carrying the pinion said projection entering the slot in the guide bar, and means for moving the cradle along the guide bar, substantially as set forth.

In witness whereof I have hereunto set my hand.

ALBERT GROVES.

Copies of this patent may be obtained for five cents each, by addressing the "Commissioner of Patents, Washington, D. C."